United States Patent
Tang

(10) Patent No.: US 11,064,350 B2
(45) Date of Patent: Jul. 13, 2021

(54) COMMUNICATION METHOD, NETWORK EQUIPMENT, AND TERMINAL EQUIPMENT

(71) Applicant: GUANGDONG OPPO MOBILE TELECOMMUNICATIONS CORP., LTD., Guangdong (CN)

(72) Inventor: Hai Tang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 149 days.

(21) Appl. No.: 16/306,895

(22) PCT Filed: Jul. 28, 2016

(86) PCT No.: PCT/CN2016/092054
§ 371 (c)(1),
(2) Date: Dec. 3, 2018

(87) PCT Pub. No.: WO2018/018500
PCT Pub. Date: Feb. 1, 2018

(65) Prior Publication Data
US 2020/0314631 A1 Oct. 1, 2020

(51) Int. Cl.
*H04W 76/27* (2018.01)
*H04W 8/24* (2009.01)
*H04W 72/04* (2009.01)

(52) U.S. Cl.
CPC ........... *H04W 8/24* (2013.01); *H04W 72/04* (2013.01); *H04W 76/27* (2018.02)

(58) Field of Classification Search
CPC . H04W 36/0005; H04W 48/08; H04W 52/34; H04W 8/24; Y02D 70/1242;
(Continued)

(56) References Cited

U.S. PATENT DOCUMENTS

2009/0046596 A1* 2/2009 Ewe .................. H04W 36/0033
370/252
2009/0274096 A1 11/2009 Fu
(Continued)

FOREIGN PATENT DOCUMENTS

| CN | 101371503 A | 2/2009 |
| CN | 101682923 A | 3/2010 |

(Continued)

OTHER PUBLICATIONS

Written Opinion of the International Search Authority in international application No. PCT/CN2016/092054, dated Apr. 25, 2017.
(Continued)

*Primary Examiner* — Jean A Gelin
(74) *Attorney, Agent, or Firm* — Ladas & Parry, LLP

(57) ABSTRACT

The embodiments of the invention provide a communication method, network equipment, and terminal equipment to enhance communication efficiency. The communication method comprises: terminal equipment generates terminal capability information indicative of a terminal capability and/or a supportability of the terminal equipment with respect to a second parameter when the terminal equipment is configured with a first parameter; and the terminal equipment transmits, to network equipment, the terminal capability information.

15 Claims, 3 Drawing Sheets

(58) Field of Classification Search
CPC ............ Y02D 70/1244; Y02D 70/1262; H04L 47/14; H04L 47/30; H04L 5/003; H04L 5/0032; H04L 5/0064; H04L 5/0094

See application file for complete search history.

(56) References Cited

U.S. PATENT DOCUMENTS

| | | | |
|---|---|---|---|
| 2010/0061285 A1* | 3/2010 | Maeda | H04W 4/06 370/312 |
| 2011/0256855 A1* | 10/2011 | Wang | H04W 8/24 455/418 |
| 2013/0028150 A1 | 1/2013 | Ma | |
| 2013/0136016 A1* | 5/2013 | Lee | H04W 72/0446 370/252 |
| 2013/0294370 A1 | 11/2013 | Fu | |
| 2014/0024372 A1* | 1/2014 | Zhao | H04W 52/0203 455/435.2 |
| 2014/0094162 A1* | 4/2014 | Heo | H04W 8/08 455/422.1 |
| 2014/0140290 A1 | 5/2014 | Bergljung | |
| 2014/0140318 A1 | 5/2014 | Uemura | |
| 2015/0181603 A1* | 6/2015 | Wakabayashi | H04W 72/0486 370/329 |
| 2016/0029211 A1* | 1/2016 | Furuta | H04W 12/02 380/270 |
| 2016/0044750 A1* | 2/2016 | Wilber | H05B 6/707 219/696 |
| 2016/0088504 A1* | 3/2016 | Chen | H04W 24/08 370/252 |
| 2016/0269919 A1 | 9/2016 | Kazmi et al. | |
| 2017/0078939 A1* | 3/2017 | Takahashi | H04L 27/2602 |
| 2017/0094571 A1* | 3/2017 | Yu | H04W 48/18 |
| 2017/0171739 A1* | 6/2017 | Suzuki | H04W 72/06 |
| 2017/0245243 A1* | 8/2017 | Siomina | H04W 76/14 |
| 2017/0265063 A1* | 9/2017 | Xie | H04L 29/08 |
| 2017/0347270 A1* | 11/2017 | Iouchi | H04W 72/0406 |
| 2018/0242235 A1* | 8/2018 | Ma | H04W 48/18 |
| 2020/0145069 A1* | 5/2020 | Ferrante | H04B 7/0608 |
| 2020/0344595 A1* | 10/2020 | Chen | H04W 72/042 |

FOREIGN PATENT DOCUMENTS

| | | | |
|---|---|---|---|
| CN | 101888646 | A | 11/2010 |
| CN | 102448176 | A | 5/2012 |
| CN | 102932927 | * | 2/2013 |
| CN | 102932927 | A | 2/2013 |
| CN | 103580781 | A | 2/2014 |
| CN | 2015047180 | A1 | 4/2015 |
| CN | 105323747 | A | 2/2016 |
| CN | 102932927 | B | 3/2016 |
| CN | 105517043 | A | 4/2016 |
| JP | 2016026450 | A | 2/2016 |
| JP | 2017524305 | A | 8/2017 |
| RU | 2414096 | C2 | 3/2011 |
| WO | 2014027811 | A1 | 2/2014 |
| WO | 2016019581 | A1 | 2/2016 |
| WO | 2016019621 | A1 | 2/2016 |

OTHER PUBLICATIONS

Qualcomm Incorporated. "Numerology and TTI multiplexing for NR Forward Compatibility Analysis", 3GPP TSG-RAN WG1 #85, R1-164692, May 2016.
First Office Action of the Brazilian application No. 1120180765570, dated Aug. 2020.
First Office Action of the Japanese application No. 2018-563872, dated Aug. 2020.
First Office Action of the Indian application No. 201917002843, dated Aug. 21, 2020.
Second Office Action of the Canadian application No. 3026448, dated Sep. 24, 2020.
First Office Action of the Singaporean application No. 11201810821S, dated Mar. 18, 2020.
Samsung, "Framework for multiplexing verticals in NR", 3GPP TSG RAN WG1 #85 R1-164001, issued on May 27, 2016, entire document.
First Office Action of the Chinese application No. 201680086009.6, dated Apr. 20, 2020.
First Office Action of the European application No. 16910081.5, dated Jun. 30, 2020.
International Search Report in international application No. PCT/CN2016/092054, dated Apr. 25, 2017.
Written Opinion of the International Searching Authority in international application No. PCT/CN2016/092054, dated Apr. 25, 2017.
"D2D capability for multi-carrier capable UE", 3GPP Draft; R2-142634 [D2D-C] D2D Capability for Multi-Carrier Capable UE [Stage2] R2, 3rd Generation Partnership Project (3GPP), Mobile Competence Centre; 650, Route Des Lucioles ; F-06921 Sophia-AN, vol. RAN WG2, No. Seoul, Korea; May 19, 2014-May 23, 2014 May 18, 2014 (May 18, 2014), XP050793717, [retrieved on May 18, 2014].
Supplementary European Search Report in the European application No. 16910081.5, dated Mar. 13, 2019.
First Office Action of the Russian application No. 2019100156, dated Oct. 10, 2019.
International Preliminary Report on Patentability in international application No. PCT/CN2016/092054, dated Jan. 29, 2019.
Office Action of the Taiwanese application No. 106122112, dated Oct. 30, 2020.
Decision of Re-examination of the Taiwanese application 106122112, dated Feb. 25, 2021.
Decision of Refusal of the Japanese application 2018-563872, dated Mar. 26, 2021.

* cited by examiner

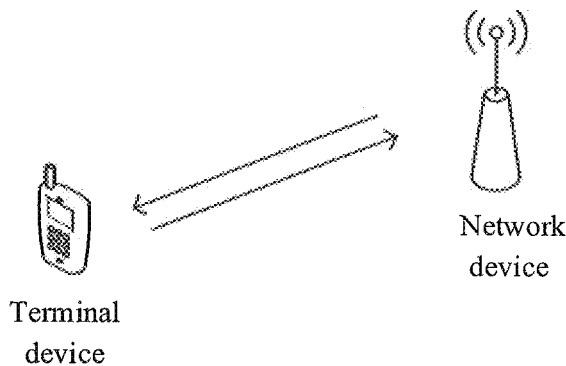

Terminal
device

Network
device

| A terminal device generates terminal capability information, the terminal capability information indicating a terminal capability of the terminal device under the condition that a first parameter is configured and/or a support capability of the terminal device for a second parameter | S201 |

| The terminal device sends the terminal capability information to a network device | S202 |

| A network device sends an indication message to a terminal device, the indication message indicating the terminal device to send a terminal capability of the terminal device under the condition that a first parameter is configured and/or a support capability of the terminal device for a second parameter | S301 |

| The network device receives terminal capability information from the terminal device, the terminal capability information indicating the terminal capability of the terminal device under the condition that the first parameter is configured and/or the support capability of the terminal device for the second parameter | S302 |

COMMUNICATION METHOD, NETWORK EQUIPMENT, AND TERMINAL EQUIPMENT

CROSS-REFERENCE TO RELATED APPLICATIONS

The present application is a U.S. national phase application of PCT Application No. PCT/CN2016/092054 filed on Jul. 28, 2016, the disclosure of which is incorporated herein by reference in its entirety.

TECHNICAL FIELD

The disclosure relates to the field of communication, and more particularly to a communication method, a network device and a terminal device.

BACKGROUND

Along with development of a communication technology, in 5th Generation (5G), a 5G system may support multiple configuration parameters. A terminal capability of a terminal device is related to a configuration parameter supported by the terminal device. For example, for a Long Term Evolution (LTE) system, a subcarrier width (15 kHz) and symbol length (1/15 kHz=66.67 us) included in a basic parameter set are fixed, A 5G system may support various types of basic parameter sets and a terminal device in the 5G system may also support various types of basic parameter sets. For different basic parameter sets, the terminal device also has different terminal capabilities. However, in a conventional art, a terminal device, when reporting terminal capability information, does not consider how to report a terminal capability when the terminal device supports multiple configuration parameters, which may bring influence to communication efficiency.

SUMMARY

The disclosure provides a communication method, a network device and a terminal device, so as to improve communication efficiency.

A first aspect provides a communication method, which may include that: a terminal device generates terminal capability information, the terminal capability information indicating a terminal capability of the terminal device under the condition that a first parameter is configured and/or a support capability of the terminal device for a second parameter; and the terminal device sends the terminal capability information to a network device.

The terminal device sends the terminal capability information to the network device and the terminal capability information may indicate a terminal capability of the terminal device under the condition that different first parameters are configured and/or the support capability of the terminal device for the second parameter, so that more pertinent scheduling of the terminal device by a network is facilitated and communication efficiency and system scheduling efficiency of the network are improved.

In combination with the first aspect, in a first possible implementation mode of the first aspect, the first parameter may include at least one of first basic parameter sets or first carrier bandwidths, and/or the second parameter may include at least one of second basic parameter sets or second carrier bandwidths.

In combination with the first possible implementation mode of the first aspect, in a second possible implementation mode of the first aspect, the second basic parameter set may include M basic parameter sets, the terminal capability information may include first information and the first information may be configured to indicate a support capability of the terminal device for each set of the M basic parameter sets.

In combination with the first or second possible implementation mode of the first aspect, in a third possible implementation mode of the first aspect, the second carrier bandwidth may include N carrier bandwidths, the terminal capability information may include second information and the second information may be configured to indicate a support capability of the terminal device for each of the N carrier bandwidths.

In combination with any abovementioned possible implementation mode of the first aspect, in a fourth possible implementation mode of the first aspect, the terminal capability information may include third information, the third information may be configured to indicate a support capability of the terminal device for a second parameter combination and the second parameter combination may include the following parameters: the second basic parameter set and the second carrier bandwidth.

In combination with any abovementioned possible implementation mode of the first aspect, in a fifth possible implementation mode of the first aspect, the terminal capability information may include fourth information, the fourth information may be configured to indicate a terminal capability of the terminal device under the condition that a first parameter combination is configured and the first parameter combination may include the following parameters: the first basic parameter set and the first carrier bandwidth.

In combination with the first aspect or any abovementioned possible implementation mode of the first aspect, in a sixth possible implementation mode of the first aspect, the operation that the terminal device sends the terminal capability information to the network device may include that: the terminal device sends the terminal capability information through Radio Resource Control (RRC) signaling.

A second aspect provides a communication method, which may include that: a network device sends an indication message to a terminal device, the indication message indicating the terminal device to send a terminal capability of the terminal device under the condition that a first parameter is configured and/or a support capability of the terminal device for a second parameter; and the network device receives terminal capability information from the terminal device, the terminal capability information indicating the terminal capability of the terminal device under the condition that the first parameter is configured and/or the support capability of the terminal device for the second parameter.

The network device sends the indication message to the terminal device to indicate the terminal device to send the terminal capability of the terminal device under the condition that the first parameter is configured and/or the support capability of the terminal device for the second parameter to enable the network device to perform system scheduling or a related operation according to the terminal capability information, so that communication efficiency and system scheduling efficiency are improved.

In combination with the second aspect, in a first possible implementation mode of the second aspect, the method is characterized in that the first parameter may include at least one of first basic parameter sets or first carrier bandwidths, and/or the second parameter may include at least one of second basic parameter sets or second carrier bandwidths.

In combination with the first possible implementation mode of the second aspect, in a second possible implementation mode of the second aspect, the second basic parameter set may include M basic parameter sets, the indication message may include first indication information and the first indication information may be configured to indicate the terminal device to send a support capability for each set of the M basic parameter sets.

In combination with the first or second possible implementation mode of the second aspect, in a third possible implementation mode of the second aspect, the second carrier bandwidth may include N carrier bandwidths, the indication message may include second indication information and the second indication information may be configured to indicate the terminal device to send a support capability for each of the N carrier bandwidths.

In combination with any abovementioned possible implementation mode of the second aspect, in a fourth possible implementation mode of the second aspect, the indication message may include third indication information, the third indication information may be configured to indicate the terminal device to send a support capability for a second parameter combination and the second parameter combination may include the following parameters: the second basic parameter set and the second carrier bandwidth.

In combination with any abovementioned possible implementation mode of the second aspect, in a fifth possible implementation mode of the second aspect, the indication message may include fourth indication information, the fourth indication information may be configured to indicate the terminal device to send a terminal capability of the terminal device under the condition that a first parameter combination is configured and the first parameter combination may include the following parameters: the first basic parameter set and the first carrier bandwidth.

In combination with the second aspect or any abovementioned possible implementation mode of the second aspect, in a sixth possible implementation mode of the second aspect, the operation that the network device receives the terminal capability information from the terminal device may include that: the network device receives the terminal capability information through RRC signaling.

A third aspect provides a terminal device, which may include: a generation module, configured to generate terminal capability information, the terminal capability information indicating a terminal capability of the terminal device under the condition that a first parameter is configured and/or a support capability of the terminal device for a second parameter; and a sending module, configured to send the terminal capability information to a network device.

A fourth aspect provides a network device, which may include: a sending module, configured to send an indication message to a terminal device, the indication message indicating the terminal device to send a terminal capability of the terminal device under the condition that a first parameter is configured and/or a support capability of the terminal device for a second parameter; and a receiving module, configured to receive terminal capability information from the terminal device, the terminal capability information indicating the terminal capability of the terminal device under the condition that the first parameter is configured and/or the support capability of the terminal device for the second parameter.

A fifth aspect provides a terminal device, which includes: a memory, configured to store a program; a transceiver, configured to communicate with another device; and a processor, configured to execute the program in the memory. When the program is executed, the processor is configured to generate terminal capability information, the terminal capability information indicating a terminal capability of the terminal device under the condition that a first parameter is configured and/or a support capability of the terminal device for a second parameter, and is configured to send, through the transceiver 620, the terminal capability information to a network device.

A sixth aspect provides a network device, which includes: a memory, configured to store a program; a transceiver, configured to communicate with another device; and a processor, configured to execute the program in the memory. When the program is executed, the processor is configured to send, through the transceiver, an indication message to a terminal device, the indication message indicating the terminal device to send a terminal capability of the terminal device under the condition that a first parameter is configured and/or a support capability of the terminal device for a second parameter, and is configured to receive, through the transceiver, terminal capability information from the terminal device, the terminal capability information indicating the terminal capability of the terminal device under the condition that the first parameter is configured and/or the support capability of the terminal device for the second parameter.

A seventh aspect provides a computer chip, which includes an input interface, an output interface, at least one processor and a memory. The processor is configured to execute a code in the memory. When the code is executed, the processor may implement each process executed by a terminal device in a communication method in the first aspect and each implementation mode.

An eighth aspect provides a computer chip, which includes an input interface, an output interface, at least one processor and a memory. The processor is configured to execute a code in the memory. When the code is executed, the processor may implement each process executed by a network device in a communication method in the second aspect and each implementation mode.

A ninth aspect provides a computer-readable storage medium, which stores a program, the program enabling a terminal device to execute any communication method in the first aspect and each implementation mode thereof.

A tenth aspect provides a computer-readable storage medium, which stores a program, the program enabling a network device to execute any communication method in the second aspect and each implementation mode thereof.

BRIEF DESCRIPTION OF DRAWINGS

In order to describe the technical solutions of the embodiments of the disclosure more clearly, the drawings required to be used in the embodiments of the disclosure will be simply introduced below. It is apparent that the drawings described below are only some embodiments of the disclosure. Other drawings may further be obtained by those of ordinary skill in the art according to these drawings without creative work.

FIG. 1 is a schematic diagram of an application scenario according to an embodiment of the disclosure.

FIG. 2 is a schematic diagram of a communication method according to an embodiment of the disclosure.

FIG. 3 is a schematic diagram of a communication method according to another embodiment of the disclosure.

DETAILED DESCRIPTION

Figure 4:
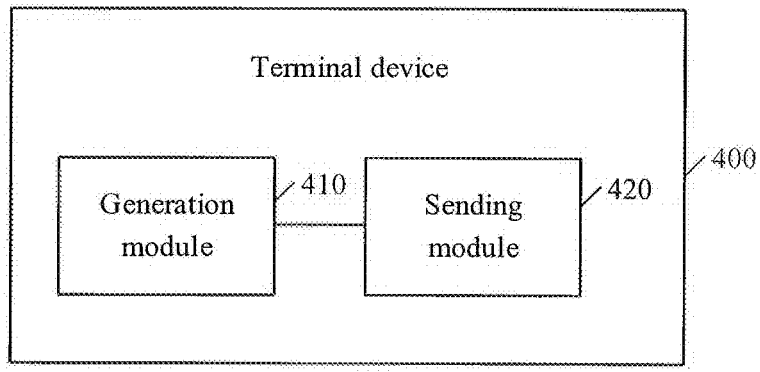
FIG. 4 is a schematic structure diagram of a terminal device according to another embodiment of the disclosure.

The technical solutions in the embodiments of the disclosure will be clearly and completely described below in combination with the drawings in the embodiments of the disclosure. It is apparent that the described embodiments are not all embodiments but part of embodiments of the disclosure. All other embodiments obtained by those of ordinary skill in the art on the basis of the embodiments in the disclosure without creative work shall fall within the scope of protection of the disclosure.

It is to be understood that the technical solutions of the embodiments of the disclosure may be applied to various communication systems, for example, a Global System of Mobile Communication (GSM), a Code Division Multiple Access (CDMA) system, a Wideband Code Division Multiple Access (WCDMA) system, a General Packet Radio Service (CPRS), an LTE system, an LIE Frequency Division Duplex (FDD) system, LTE Time Division Duplex (TDD), a Universal Mobile Telecommunication System (UMTS), a Worldwide Interoperability for Microwave Access (WiMAX) communication system, a 5G system or a New Radio (NR) system.

In the embodiments of the disclosure, teens "network" and "system" are often used alternately and their meanings may be understood by those skilled in the art. A terminal device involved in the embodiments of the disclosure may include various handheld devices, vehicle-mounted devices, wearable devices, computing devices or other processing devices connected to wireless modems, which have a wireless communication function, as well as User Equipment (UE), Mobile Stations (MSS), terminals, terminal devices and the like in various forms. For convenient description, the devices mentioned above are collectively referred to as terminal devices in the embodiments of the disclosure.

In the embodiments of the disclosure, a network device may be a device configured to communicate with the terminal device. The network device may be a Base Transceiver Station (BTS) in the GSM or the CDMA, may also be a NodeB (NB) in the WCDMA system, may also be an Evolutional Node B (eNB or eNodeB) in the LTE system and may further be a wireless controller in a Cloud Radio Access Network (CRAN) scenario, or the network device may be a relay station, an access point, a vehicle-mounted device, a wearable device, a network device in the future 5G network, a network device in the future evolved PLMN or the like. There are no limits made in the embodiments of the disclosure.

It is to be understood that a basic parameter set in the embodiments of the disclosure may also be called a numerology and it may refer to most basic parameters of a communication system (for example, a cellular system). For example, for an LTE system or a 5G system, numerology may include a system subcarrier spacing, a symbol width and the like.

FIG. 1 is a schematic diagram of an application scenario of a communication method according to an embodiment of the disclosure. As shown in FIG. 1, the application scenario may include a network device and a terminal device. The network device may communicate with the terminal device through a radio link.

FIG. 2 illustrates a communication method 200 according to an embodiment of the disclosure. The method 200 may be executed by a terminal device. The method 200 includes the following steps.

In S201, the terminal device generates terminal capability information, the terminal capability information indicating a terminal capability of the terminal device under the condition that a first parameter is configured and/or a support capability of the terminal device for a second parameter.

In a wireless network, different technologies have different requirements on the terminal device. For example, for a carrier aggregation technology in an LTE system, the number of carriers supported by a terminal for aggregation includes: two-carrier aggregation, three-carrier aggregation and the like, and different carrier aggregation and carrier numbers involved therein are supported on different bands. Therefore, the terminal device is required to report its support capabilities for various technologies to a network side, namely reporting a terminal capability. For example, for the carrier aggregation technology, the terminal device is required to report the number of carriers supported on various bands for aggregation (the number of carriers to be aggregated) and carrier aggregation types (uplink or downlink) to a network device.

Each of the first parameter and the second parameter may include one or more parameters. The terminal device may have different corresponding terminal capabilities (UE capabilities) under the condition that different first parameters are configured and, meanwhile, the terminal device may support one or more second parameters. For example, the same terminal device may support multiple basic parameter sets and, under the condition that different basic parameter sets are configured for the terminal device, the terminal device also has different terminal capabilities. The terminal device may report the corresponding terminal capability of the terminal device when each basic parameter set is configured through the terminal capability information. Or, the terminal device may report support capabilities of the terminal device for different basic parameter sets through the terminal capability information.

Optionally, the first parameter may include at least one of first basic parameter sets or first carrier bandwidths. And/or the second parameter may include at least one of second basic parameter sets or second carrier bandwidths. It is to be understood that the first parameter and the second parameter may be parameters which are at least partially the same. Or, the first parameter and the second parameter may also be different parameters. For example, the first basic parameter set and the second basic parameter set may be basic parameter sets which are at least partially the same or different and the first carrier bandwidth and the second carrier bandwidth may also be carrier bandwidths which are at least partially the same or different.

Optionally, the first basic parameter set and the first carrier bandwidth may be a basic parameter set and carrier bandwidth supported by the terminal device. The first basic parameter set and the first carrier bandwidth may refer to one or more basic parameter sets and one or more carrier bandwidths. The first basic parameter set and the second carrier bandwidth may be all basic parameter sets and all carrier bandwidths supported by the terminal device and may also be part of basic parameter sets and part of carrier bandwidths supported by the terminal device.

Optionally, the terminal capability of the terminal device under the condition that the first parameter is configured may be a corresponding terminal capability under the condition that the first basic parameter set and/or the first carrier bandwidth are/is configured for the terminal device. For example, the terminal capability of the terminal device under the condition that the first parameter is configured may be a terminal capability of the terminal device under the condition that each basic parameter set in multiple basic parameter sets is configured, or a terminal capability of the terminal device under the condition that each carrier bandwidth in multiple carrier bandwidths is configured, or a terminal capability of the terminal device under the condition that a combination of the first basic parameter set and the first carrier bandwidth is configured.

It is to be understood that the terminal device corresponds to different terminal capabilities under the condition that different basic parameter sets are configured. The terminal device also corresponds to different terminal capabilities (for example, carrier aggregation support capabilities) under the condition that different carrier bandwidths are configured.

Optionally, the terminal capability information may further include information about the support capability of the terminal device for the second parameter. For example, the terminal capability information may include information indicating a support capability of the terminal device for the second basic parameter set and/or the second carrier bandwidth.

Optionally, the terminal capability may also be called a UE capability.

In S202, the terminal device sends the terminal capability information to a network device.

In the embodiment of the disclosure, the terminal device sends the terminal capability information to the network device and the terminal capability information may indicate a terminal capability of the terminal device under the condition that different first parameters are configured and/or the support capability of the terminal device for the second parameter, so that more pertinent scheduling of the terminal device by a network is facilitated and communication efficiency and system scheduling efficiency of the network are improved.

Optionally, in the method 200, before the terminal device receives the terminal capability information, the terminal device may receive an indication message sent by the network device, the indication message indicating the terminal device to send the terminal capability of the terminal device under the condition that the first parameter is configured and/or the support capability of the terminal device for the second parameter. The terminal device sends the terminal capability information to the network device according to the indication message.

Optionally, in the method 200, the second basic parameter set may include M basic parameter sets, the terminal capability information includes first information for indicating a support capability of the terminal device for each set of the M basic parameter sets, wherein M≥1.

In the embodiment of the disclosure, the terminal device may indicate basic parameter sets supported and/or not supported by the terminal device in the terminal capability information to improve the communication efficiency of the terminal device.

Optionally, the indication message received by the terminal device from the network device may include first indication information and the first indication information may be configured to indicate the terminal device to send the support capability of the terminal device for each set of the M basic parameter sets.

For example, the terminal device may send the terminal capability information through RRC signaling. For example, the terminal device may report the basic parameter sets supported by the terminal device through the RRC signaling in an enumeration manner. Or, the terminal device may also report the terminal capability information to the network device in a bitmap form according to a basic parameter set list configured by the network device in advance. Each table entry in the list may represent a basic parameter set which may be supported by the network device and the terminal device may determine each basic parameter set supported or not supported by the terminal device in the list and indicate the basic parameter sets supported and/or not supported by the terminal device to the network device through a bitmap, each bit in the bitmap corresponding to a basic parameter set in the list. For example, when a bit is set to be 1, it may be indicated that the terminal device supports the basic parameter set corresponding to the bit and, when the bit is set to be 0, it may be indicated that the terminal device does not support the basic parameter set corresponding to the bit. Or, another method may be adopted to send the terminal capability information to the network device. There are no limits made thereto in the embodiment of the disclosure.

Optionally, in the method 200, the terminal capability information may include information about the corresponding terminal capability of the terminal device under the condition that the first basic parameter set is configured. For example, as shown in Table 1, the terminal device may report the corresponding terminal capability of the terminal device under the condition that the first basic parameter set is configured to the network device according to Table 1.

TABLE 1

| Numerology | UE capability |
| --- | --- |
| Numerology 1 | |
| Numerology 2 | |
| . . . | . . . |

Optionally, in the method 200, the second carrier bandwidth may include N carrier bandwidths, the terminal capability information includes second information for indicating a support capability of the terminal device for each of the N carrier bandwidths, wherein N≥1.

In the embodiment of the disclosure, the terminal device may indicate carrier bandwidths supported and/or not supported by the terminal device in the terminal capability information to enable the network device to perform system scheduling or another operation according to the terminal capability information, so that the communication efficiency is improved.

Optionally, the indication message received by the terminal device from the network device may include second indication information and the second indication information may be configured to indicate the terminal device to send the support capability of the terminal device for each of the N carrier bandwidths.

For example, the terminal device may also adopt the RRC signaling to send the second carrier bandwidth supported by the terminal device to the network device in the enumeration manner. Or, similar to the above, the terminal device may also indicate a support capability of the terminal device for the second carrier bandwidth to the network device through a bitmap according to a list configured by the network device. For example, each table entry in the list may represent a carrier bandwidth supported by the network device and each bit in the bitmap may correspond to a carrier bandwidth in the list. A bit may be assigned with 1 or 0 to indicate whether the terminal device supports the corresponding carrier bandwidth or not.

Optionally, in the method 200, the terminal capability information may include information about the corresponding terminal capability of the terminal device under the condition that the first carrier bandwidth is configured. For example, as shown in Table 2, the terminal device may report the corresponding terminal capability of the terminal device under the condition that the first carrier bandwidth is configured to the network device according to Table 2.

TABLE 2

| Carrier bandwidth | UE capability |
|---|---|
| Carrier bandwidth i | |
| ... | ... |
| Carrier bandwidth j | |

Optionally, in the method 200, the terminal capability information includes third information for indicating a support capability of the terminal device for a second parameter combination and the second parameter combination includes the second basic parameter set and the second carrier bandwidth.

In the embodiment of the disclosure, the terminal device may indicate combinations of basic parameter sets and carrier bandwidths supported and/or not supported by the terminal device in the terminal capability information to enable the network device to perform system scheduling, or another operation according to the terminal capability information, so that the communication efficiency is improved.

Optionally, the indication message received by the terminal device from the network device may include third indication information, the third indication information may be configured to indicate the terminal device to send a support capability of the terminal device for a second parameter combination and the second parameter combination includes the second basic parameter set and the second carrier bandwidth.

For example, the terminal device may also adopt the RRC signaling to send the combination of the second basic parameter set and second carrier bandwidth supported by the terminal device to the network device in the enumeration manner. Or, the terminal device may also indicate a support capability of the terminal device for the combination of the second basic parameter set and the second carrier bandwidth to the network device through a bitmap according to a list configured by the network device. For example, a table entry in the list may represent a second parameter set supported by the network device and each bit in the bitmap may correspond to a second parameter set in the list. A bit may be assigned with 1 or 0 to indicate whether the terminal device supports the corresponding second parameter set or not.

Optionally, in the method 200, the terminal capability information includes fourth information for indicating a terminal capability of the terminal device under the condition that a first parameter combination is configured and the first parameter combination includes the first basic parameter set and the first carrier bandwidth.

In the embodiment of the disclosure, the terminal device may indicate the terminal capability of the terminal device under the condition that the first parameter combination is configured in the terminal capability information to enable the network device to perform system scheduling or another operation according to the terminal capability information, so that the communication efficiency is improved.

Optionally, the indication message received by the terminal device from the network device may include fourth indication information, the fourth indication information may be configured to indicate the terminal device to send a support capability of the terminal device for the first parameter combination and the first parameter combination includes the first basic parameter set and the first carrier bandwidth.

When different combinations of basic parameter sets and carrier bandwidths are configured, the terminal device has different support capabilities for a certain terminal capability. For example, 1024 QAM may be supported by the terminal device only when a specific combination of a basic parameter set and a carrier bandwidth is configured for the terminal device. Therefore, as shown in Table 3, the terminal device may report terminal device capabilities for different combinations of basic parameter sets and carrier bandwidths. For example, for some specific technologies supported by the terminal device, the terminal device may report terminal capabilities of the terminal device under different combinations of basic parameter sets and carrier bandwidths to the network device in a form of Table 3.

TABLE 3

| Numerology | Carrier bandwidth | UE capability |
|---|---|---|
| Numerology 1 | Carrier bandwidth i | |
| | ... | |
| | Carrier bandwidth j | |
| Numerology 2 | Carrier bandwidth m | |
| | ... | |
| | Carrier bandwidth n | |
| ... | ... | ... |

FIG. 3 illustrates a communication method 300 according to an embodiment of the disclosure. The method may be executed by a network device. Contents the same as or similar to FIG. 2 in the method shown in FIG. 3 may refer to related descriptions about the method of FIG. 2 and will not be elaborated herein. The method 300 includes the following steps.

In S301, the network device sends an indication message to a terminal device, the indication message indicating the terminal device to send a terminal capability of the terminal device under the condition that a first parameter is configured and/or a support capability of the terminal device for a second parameter.

In S302, the network device receives terminal capability information from the terminal device, the terminal capability information indicating the terminal capability of the terminal device under the condition that the first parameter is configured and/or the support capability of the terminal device for the second parameter.

In the embodiment of the disclosure, the network device sends the indication message to the terminal device to indicate the terminal device to send the terminal capability of the terminal device under the condition that the first parameter is configured and/or the support capability of the terminal device for the second parameter to enable the network device to perform system scheduling or a related operation according to the terminal capability information, so that communication efficiency and system scheduling efficiency are improved.

Optionally, the first parameter includes at least one of first basic parameter sets or first carrier bandwidths, and/or the second parameter includes at least one of second basic parameter sets or second carrier bandwidths.

Optionally, the second basic parameter sets include M basic parameter sets, the indication message includes first indication information for indicating the terminal device to send a support capability for each set of the M basic parameter sets.

Optionally, the second carrier bandwidths include N carrier bandwidths, the indication message includes second indication information for indicating the terminal device to send a support capability for each of the N carrier bandwidths.

Optionally, the indication message includes third indication information for indicating the terminal device to send a support capability for a second parameter combination and the second parameter combination includes the second basic parameter set and the second carrier bandwidth.

Optionally, the indication message includes fourth indication information for indicating the terminal device to send a terminal capability of the terminal device under the condition that a first parameter combination is configured and the first parameter combination includes the first basic parameter set and the first carrier bandwidth.

Optionally, the operation that the network device receives the terminal capability information from the terminal device includes that: the network device receives the terminal capability information through RRC signaling.

The communication method of the embodiments of the disclosure is described above in combination with FIG. 1 to FIG. 3, and a terminal device and network device of the embodiments of the disclosure will be described below in combination with FIG. 4 to FIG. 7 in detail.

FIG. 4 is a schematic block diagram of a terminal device according to an embodiment of the disclosure. The terminal device may be configured to execute the steps executed by the terminal device in the method 200 or the method 300. The terminal device 400 shown in FIG. 4 includes a generation module 410 and a sending module 420.

The generation module 410 is configured to generate terminal capability information, the terminal capability information indicating a terminal capability of the terminal device 400 under the condition that a first parameter is configured and/or a support capability of the terminal device 400 for a second parameter.

The sending module 420 is configured to send the terminal capability information to a network device.

In the embodiment of the disclosure, the terminal device sends the terminal capability information to the network device and the terminal capability information may indicate a terminal capability of the terminal device under the condition that different first parameters are configured and/or the support capability of the terminal device for the second parameter, so that more pertinent scheduling of the terminal device by a network is facilitated and communication efficiency and system scheduling efficiency of the network are improved.

Optionally, the first parameter includes at least one of first basic parameter sets or first carrier bandwidths, and/or the second parameter includes at least one of second basic parameter sets or second carrier bandwidths.

Optionally, the second basic parameter sets include M basic parameter sets, the terminal capability information includes first information for indicating a support capability of the terminal device 400 for each set of the M basic parameter sets.

Optionally, the second carrier bandwidths include N carrier bandwidths, the terminal capability information includes second information for indicating a support capability of the terminal device 400 for each of the N carrier bandwidths.

Optionally, the terminal capability information includes third information for indicating a support capability of the terminal device 400 for a second parameter combination and the second parameter combination includes the second basic parameter set and the second carrier bandwidth.

Optionally, the terminal capability information includes fourth information for indicating a terminal capability of the terminal device 400 under the condition that a first parameter combination is configured and the first parameter combination includes the first basic parameter set and the first carrier bandwidth.

Optionally, the sending module 420 is specifically configured to send the terminal capability information through RRC signaling.

Figure 5:
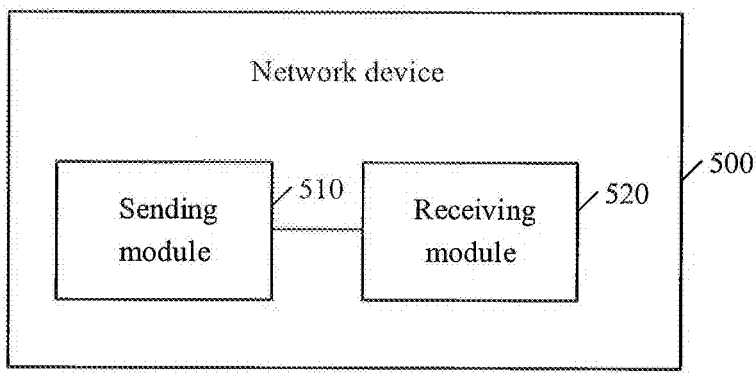
FIG. 5 is a schematic structure diagram of a network device according to an embodiment of the disclosure.

FIG. 5 is a schematic block diagram of a network device according to an embodiment of the disclosure. The network device may be configured to execute the steps executed by the network device in the method 200 or the method 300. The network device 500 shown in FIG. 5 includes a sending module 510 and a receiving module 520.

The sending module 510 is configured to send an indication message to a terminal device, the indication message indicating the terminal device to send a terminal capability of the terminal device under the condition that a first parameter is configured and/or a support capability of the terminal device for a second parameter.

The receiving module 520 is configured to receive terminal capability information from the terminal device, the terminal capability information indicating the terminal capability of the terminal device under the condition that the first parameter is configured and/or the support capability of the terminal device for the second parameter.

In the embodiment of the disclosure, the network device sends the indication message to the terminal device to indicate the terminal device to send the terminal capability of the terminal device under the condition that the first parameter is configured and/or the support capability of the terminal device for the second parameter to enable the network device to perform system scheduling or a related operation according to the terminal capability information, so that communication efficiency and system scheduling efficiency are improved.

Optionally, the first parameter includes at least one of first basic parameter sets or first carrier bandwidths, and/or the second parameter includes at least one of second basic parameter sets or second carrier bandwidths.

Optionally, the second basic parameter sets include M basic parameter sets, the indication message includes first indication information for indicating the terminal device to send a support capability for each set of the M basic parameter sets.

Optionally, the second carrier bandwidths include N carrier bandwidths, the indication message includes second indication information for indicating the terminal device to send a support capability for each of the N carrier bandwidths.

Optionally, the network device is characterized in that the indication message includes third indication information for indicating the terminal device to send a support capability for a second parameter combination and the second parameter combination includes the second basic parameter set and the second carrier bandwidth.

Optionally, the indication message includes fourth indication information for indicating the terminal device to send a terminal capability of the terminal device under the condition that a first parameter combination is configured and the first parameter combination includes the first basic parameter set and the first carrier bandwidth.

Optionally, the receiving module is specifically configured to receive the terminal capability information through RRC signaling.

Figure 6:
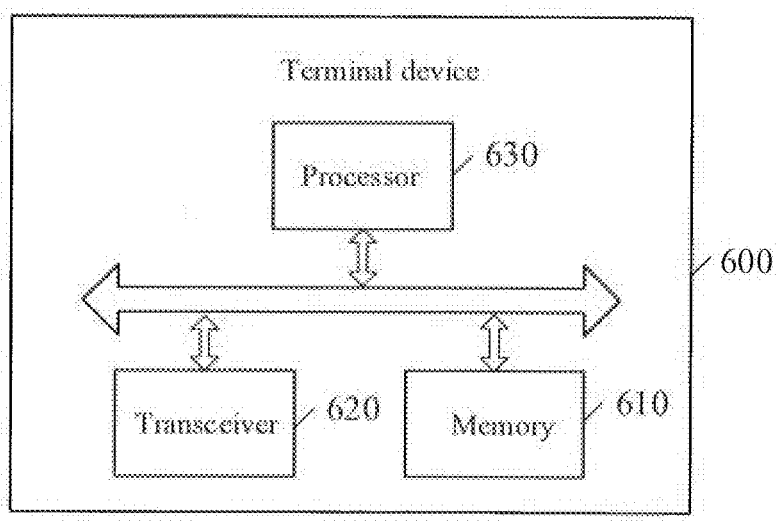
FIG. 6 is a schematic structure diagram of a terminal device according to another embodiment of the disclosure.

FIG. 6 is a schematic block diagram of a terminal device according to an embodiment of the disclosure. The terminal device may be configured to execute the steps executed by the terminal device in the method 200 or the method 300. The terminal device 600 shown in FIG. 6 includes a memory 610, a transceiver 620 and a processor 630.

The memory 610 is configured to store a program.

The transceiver 620 is configured to communicate with another device.

The processor 630 is configured to execute the program in the memory 610. When the program is executed, the processor 630 is configured to generate terminal capability information, the terminal capability information indicating a terminal capability of the terminal device 600 under the condition that a first parameter is configured and/or a support capability of the terminal device 600 for a second parameter, and is configured to send, through the transceiver 620, the terminal capability information to a network device.

In the embodiment of the disclosure, the terminal device sends the terminal capability information to the network device and the terminal capability information may indicate a terminal capability of the terminal device under the condition that different first parameters are configured and/or the support capability of the terminal device for the second parameter, so that more pertinent scheduling of the terminal device by a network is facilitated and communication efficiency and system scheduling efficiency of the network are improved.

Optionally, the first parameter includes at least one of first basic parameter sets or first carrier bandwidths, and/or the second parameter includes at least one of second basic parameter sets or second carrier bandwidths.

Optionally, the second basic parameter sets include M basic parameter sets, the terminal capability information includes first information for indicating a support capability of the terminal device 600 for each set of the M basic parameter sets.

Optionally, the second carrier bandwidths include N carrier bandwidths, the terminal capability information includes second information for indicating a support capability of the terminal device 600 for each of the N carrier bandwidths.

Optionally, the terminal capability information includes third information for indicating a support capability of the terminal device 600 for a second parameter combination and the second parameter combination includes the second basic parameter set and the second carrier bandwidth.

Optionally, the terminal capability information includes fourth information for indicating a terminal capability of the terminal device 600 under the condition that a first parameter combination is configured and the first parameter combination includes the first basic parameter set and the first carrier bandwidth.

Optionally, the processor 630 is specifically configured to send, through the transceiver 620, the terminal capability information through RRC signaling.

Figure 7:
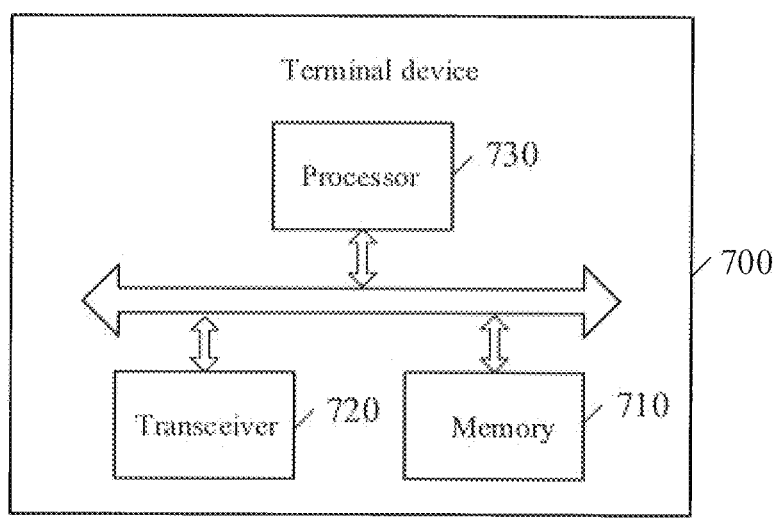
FIG. 7 is a schematic structure diagram of a network device according to another embodiment of the disclosure.

FIG. 7 is a schematic block diagram of a network device according to an embodiment of the disclosure. The network device may be configured to execute the steps executed by the network device in the method 200 or the method 300. The network device 700 shown in FIG. 7 includes a memory 710, a transceiver 720 and a processor 720.

The memory 710 is configured to store a program.

The transceiver 720 is configured to communicate with another device.

The processor 730 is configured to execute the program in the memory 710. When the program is executed, the processor 730 is configured to send, through the transceiver 720, an indication message to a terminal device, the indication message indicating the terminal device to send a terminal capability of the terminal device under the condition that a first parameter is configured and/or a support capability of the terminal device for a second parameter, and is configured to receive, through the transceiver 720, terminal capability information from the terminal device, the terminal capability information indicating the terminal capability of the terminal device under the condition that the first parameter is configured and/or the support capability of the terminal device for the second parameter.

In the embodiment of the disclosure, the network device sends the indication message to the terminal device to indicate the terminal device to send the terminal capability of the terminal device under the condition that the first parameter is configured and/or the support capability of the terminal device for the second parameter to enable the network device to perform system scheduling or a related operation according to the terminal capability information, so that communication efficiency and system scheduling efficiency are improved.

Optionally, the first parameter includes at least one of first basic parameter sets or first carrier bandwidths, and/or the second parameter includes at least one of second basic parameter sets or second carrier bandwidths.

Optionally, the second basic parameter sets include M basic parameter sets, the indication message includes first indication information for indicating the terminal device to send a support capability for each set of the M basic parameter sets.

Optionally, the second carrier bandwidths include N carrier bandwidths, the indication message includes second indication information for indicating the terminal device to send a support capability for each of the N carrier bandwidths.

Optionally, the indication message includes third indication information for indicating the terminal device to send a support capability for a second parameter combination and the second parameter combination includes the second basic parameter set and the second carrier bandwidth.

Optionally, the indication message includes fourth indication information for indicating the terminal device to send a terminal capability of the terminal device under the condition that a first parameter combination is configured and the first parameter combination includes the first basic parameter set and the first carrier bandwidth.

Optionally, a receiving module is specifically configured to receive the terminal capability information through RRC signaling.

It is to be understood that the processor in the embodiment of the disclosure may be an integrated circuit chip and has a signal processing capability. In an implementation process, each step of the method embodiments may be completed by an integrated logical circuit of hardware in the processor or an instruction in a software form. The processor may be a universal processor, a Digital Signal Processor (DSP), an Application Specific Integrated Circuit (ASIC), a Field Programmable Gate Array (FPGA) or another programmable logical device, discrete gate or transistor logical device and discrete hardware component. Each method, step and logical block diagram disclosed in the embodiments of the disclosure may be implemented or executed. The universal processor may be a microprocessor or the processor may also be any conventional processor and the like. The steps of the methods disclosed in combination with the embodiments of the disclosure may be directly embodied to be executed and completed by a hardware decoding processor or executed and completed by a combination of hardware and software modules in the decoding processor. The software module may be located in a mature storage medium in this field such as a Random Access Memory (RAM), a flash memory, a Read-Only Memory (ROM), a Programmable ROM (PROM) or Electrically Erasable PROM (EEPROM) and a register. The storage medium is located in a memory, and the processor reads information in the memory, and completes the steps of the methods in combination with hardware.

It can be understood that the memory in the embodiment of the disclosure may be a volatile memory or a nonvolatile memory, or may include both the volatile and nonvolatile memories, wherein the nonvolatile memory may be a ROM, a PROM, an Erasable PROM (EPROM), an EEPROM or a flash memory. The volatile memory may be a RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DR RAM). It is to be noted that the memory of a system and method described in the disclosure is intended to include, but not limited to, memories of these and any other proper types.

Those of ordinary skill in the art may realize that the units and algorithm steps of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the disclosure.

Those skilled in the art may clearly learn about that specific working processes of the system, device and unit described above may refer to the corresponding processes in the method embodiment and will not be elaborated herein for convenient and brief description.

In some embodiments provided by the application, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each function unit in each embodiment of the disclosure may be integrated into a processing unit, each unit may also exist independently, and two or more than two units may also be integrated into a unit.

When being realized in form of software functional unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the steps of the method in each embodiment of the disclosure. The abovementioned storage medium includes: various media capable of storing program codes such as a U disk, a mobile hard disk, a ROM, a RAM, a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A communication method, comprising:
generating, by a terminal device, terminal capability information, the terminal capability information indicating a terminal capability of the terminal device under the condition that a first parameter is configured and a support capability of the terminal device for a second parameter; and
sending, by the terminal device, the terminal capability information to a network device;
wherein the first parameter comprises at least one of first basic parameter sets or first carrier bandwidths, and the second parameter comprises second basic parameter sets and second carrier bandwidths; and
the second basic parameter sets comprise M basic parameter sets, the terminal capability information comprises first information for indicating a support capability of the terminal device for each set of the M basic parameter sets, where M≥1.

2. The communication method of claim 1, wherein the second carrier bandwidths comprise N carrier bandwidths, the terminal capability information comprises second information for indicating a support capability of the terminal device for each of the N carrier bandwidths, where N≥1.

3. The communication method of claim 1, wherein the terminal capability information comprises third information for indicating a support capability of the terminal device for a second parameter combination and the second parameter combination comprises the second basic parameter set and the second carrier bandwidth.

4. The communication method of claim 1, wherein the terminal capability information comprises fourth information for indicating a terminal capability of the terminal device under the condition that a first parameter combination is configured and the first parameter combination comprises the first basic parameter set and the first carrier bandwidth.

5. The communication method according to claim 1, wherein sending, by the terminal device, the terminal capability information to the network device comprises:
sending, by the terminal device, the terminal capability information through Radio Resource Control (RRC) signaling.

6. The communication method of claim 1, wherein the M basic parameter sets comprises a subcarrier spacing.

7. A communication method, comprising:
sending, by a network device, an indication message to a terminal device, the indication message indicating the terminal device to send terminal capability information, the terminal capability information indicating a terminal capability of the terminal device under the condition that a first parameter is configured and a support capability of the terminal device for a second parameter; and
receiving, by the network device, terminal capability information from the terminal device, the terminal capability information;
wherein the first parameter comprises at least one of first basic parameter sets or first carrier bandwidths, and the second parameter comprises second basic parameter sets and second carrier bandwidths; and
the second basic parameter sets comprise M basic parameter sets, the indication message comprises first indication information for indicating the terminal device to send a support capability for each set of the M basic parameter sets, where M≥1.

8. The communication method of claim 7, wherein the second carrier bandwidths comprise N carrier bandwidths, the indication message comprises second indication information for indicating the terminal device to send a support capability for each of the N carrier bandwidths, where N≥1.

9. The communication method of claim 7, wherein the indication message comprises third indication information for indicating the terminal device to send a support capability for a second parameter combination and the second parameter combination comprises the second basic parameter set and the second carrier bandwidth.

10. The communication method of claim 7, wherein the indication message comprises fourth indication information for indicating the terminal device to send a terminal capability of the terminal device under the condition that a first parameter combination is configured and the first parameter combination comprises the first basic parameter set and the first carrier bandwidth, and wherein receiving, by the network device, the terminal capability information from the terminal device comprises:
receiving, by the network device, the terminal capability information through Radio Resource Control (RRC) signaling.

11. A terminal device, comprising:
a memory having storing instructions thereon; and
a processor for executing the instructions to:
generate terminal capability information, the terminal capability information indicating a terminal capability of the terminal device under the condition that a first parameter is configured and a support capability of the terminal device for a second parameter; and
send the terminal capability information to a network device;
wherein the first parameter comprises at least one of first basic parameter sets or first carrier bandwidths, and the second parameter comprises second basic parameter sets and second carrier bandwidths; and
the second basic parameter sets comprise M basic parameter sets, the terminal capability information comprises first information for indicating a support capability of the terminal device for each set of the M basic parameter sets, where M≥1.

12. The terminal device of claim 11, wherein the second carrier bandwidths comprise N carrier bandwidths, the terminal capability information comprises second information for indicating a support capability of the terminal device for each of the N carrier bandwidths, where N≥1.

13. The terminal device of claim 11, wherein the terminal capability information comprises third information for indicating a support capability of the terminal device for a second parameter combination and the second parameter combination comprises the second basic parameter set and the second carrier bandwidth.

14. The terminal device of claim 11, wherein the terminal capability information comprises fourth information for indicating a terminal capability of the terminal device under the condition that a first parameter combination is configured and the first parameter combination comprises the first basic parameter set and the first carrier bandwidth.

15. The terminal device of claim 11, wherein the processor is further configured to execute the instructions to send the terminal capability information through Radio Resource Control (RRC) signaling.

* * * * *